United States Patent Office 3,356,573
Patented Dec. 5, 1967

3,356,573
17α - ACYLOXY - 6 - METHYLPREGNA - 4,6 - DIENE-3,20-DIONES AND METHOD FOR PREPARATION OF THESE AND RELATED 6-METHYL-3-OXO-Δ$^{4,6}$-STEROIDS
David Neville Kirk, Vladimir Petrow, and David Morton Williamson, London, England, assignors to The British Drug Houses Limited, London, England, a company of Great Britain
No Drawing. Filed Oct. 27, 1959, Ser. No. 848,917
Claims priority, application Great Britain, Nov. 4, 1958, 35,428/58
12 Claims. (Cl. 167—74)

This invention is for improvements in or relating to organic compounds, and has particular reference to a method for the preparation of 6-methyl-3-oxo-Δ$^{4,6}$-steroids.

It is an object of the invention to provide a new method for the preparation of 6-methyl-3-oxo-Δ$^{4,6}$-steroids which are of value as intermediates in the preparation of other biologically active compounds or which are biologically active in their own right. Thus, for example the method of the invention may be used for the preparation of 6-methyl-pregna-4,6-diene-3,20-dione, which has progestational properties or of 17β-hydroxy-6,17α-dimethyl-androsta-4,6-dien-3-one, which has androgenic properties.

It is another object of the invention to provide novel 17-acyloxy-6-methylpregna-4,6-diene-3,20-diones of the general formula:

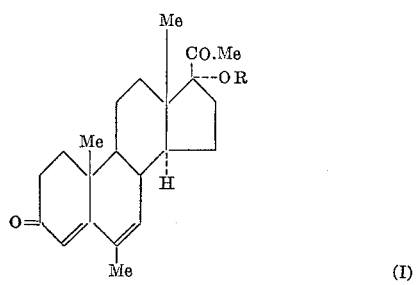

(where R is an ester group containing up to ten carbon atoms) which are of value on account of their progestational properties. For example, 17α-acetoxy-6-methylpregna-4,6-diene-3,20-dione is a highly potent orally active progestational agent which considerably exceeds ethisterone in activity.

The invention also provides the following new compounds:

17α-acetoxy-6-methylpregna-4,6-diene-3,20-dione
17α-caproyloxy-6-methylpregna-4,6-diene-3,20-dione
17α-n-butyroxy-6-methylpregna-4,6-diene-3,20-dione
17α-n-valeroxy-6-methylpregna-4,6-diene,3-20-dione
17α-propionoxy-6-methylpregna-4,6-diene-3,20-dione which are of value on account of their progestational properties. 17α-acetoxy-6-methylpregna-4,6-diene-3,20-dione is the preferred ester. In the standard Clauberg assay (oral route) for the determination of progestational activity, this compound is found to be ca. 200 times more potent than dimethisterone (6α,21-dimethylethisterone or 6α,21-dimethylanhydrohydroxyprogesterone). As dimethisterone is known to be slightly more than 10 times as active as anhydrohydroxyprogesterone (ethisterone) in the Clauberg assay (David, Hartley, Millson and Petrow, J. Pharm. Pharmacol., 1957, 9, 929) on oral administration it will be readily appreciated by those skilled in the art that 17α-acetoxy-6-methylpregna-4,6-diene-3,20-dione is a progestational agent of quite unusual potency. The material has no apparent effect upon Na$^+$, K$^+$ and Cl$^-$ balance. It does not produce diuresis in saline-loaded rats but has some diuretic activity in the adrenalectomised rat. The material does not appear to possess gluco-corticoid, anabolic or androgenic activity. It shows ovulation-inhibiting properties, which renders it of value in, for example, certain aspects of veterinary practice. It is useful in the treatment of dysmenorrhea, amenorrhea, endometrosis and threatened abortion in both clinical and veterinary practice. It may be adminstered to the animal organism in a wide variety of oral and subcutaneous dosage forms singly or in admixture with other coacting compounds. Thus it can be associated with a pharmaceutical carrier which can be a solid material or a liquid in which the compound is dissolved, dispersed or suspended. The solid compositions can take the form of tablets, powders, capsules or pills, preferably in unit dosage forms for simple administration and precise dosage. The liquid compositions can take the form of solutions, emulsions, suspensions, syrups and elixirs.

The invention also provides:

17β - hydroxy-6-methyl-17α-(prop-l-ynyl)androsta-4,6-dien-3-one which is of value as a progestational agent.

16α,17α-isopropylidenedioxy-6-methylpregna-4,6-diene-3,20-dione, which is of value on account of its progestational and other properties.

6-methylpregna-4,6-16-triene-3,20-dione, and 6,16-dimethylpregna-4,6,16-triene-3,20-dione which are of value as intermediates.

6,16 - dimethyl-16,17-epoxypregna-4,6-diene-3,20-dione which is of value as an intermediate. Thus, for example, it may be converted by the action of sulphuric acid in aqueous-dioxan into 6-methyl-16-methylene-17α-hydroxypregna-4,6-diene-3,20-dione which is a valuable raw material readily convertible into the 17α-acetoxy derivative, which has outstanding progestational properties.

No convenient method has hitherto been available for the direct preparation of 6-methyl-3-oxo-Δ$^{4,6}$-steroids from 3β-hydroxy-6-methyl-Δ$^5$-steroids, which are readily prepared by methods which we have described previously (see, for example, our co-pending Applications Nos. 785,581, now Patent No. 2,981,732 issued Apr. 25, 1961; 785,582, now Patent No. 2,998,435 issued Aug. 29, 1961; 755,368, now Patent No. 3,004,966 issued Oct. 17, 1961; 731,154, now Patent No. 3,002,969 issued Oct. 3, 1961 and 762,712, now Patent No. 3,004,991 issued Oct. 17, 1961.

According to the present invention there is provided a method for the preparation of 6-methyl-3-oxo-Δ$^{4,6}$-steroids having the general formula

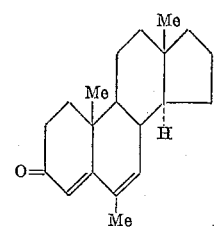

which method comprises reacting a 3β-hydroxy-6-methyl-Δ$^5$-steroid having the general formula

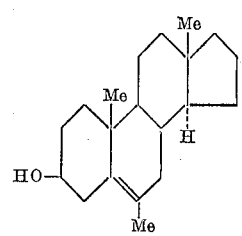

with a benzoquinone in the presence of an Oppenauer oxidant.

The benzoquinone is preferably p-benzoquinone or chloranil (tetrachloro-p-benzoquinone); 2,3 - dicyano-p-benzoquinone or 2,3-dichloro-5,6-dicyano-p-benzoquinone may also be employed.

The Oppenauer oxidant is an aluminum alkoxide preferably aluminum isopropoxide, aluminum tert.-butoxide or an aluminum chloroalkoxide such as aluminum chloroisopropoxide in a solvent, preferably benzene or toluene.

The solvent may, however, be any convenient solvent or mixture of solvents in which the reactants are soluble and stable, such as benzene, toluene or xylene, or mixtures of these solvents with each other or with diluents such as dioxan, diethyl ether, dibutyl ether or tetrahydrofuran. The reaction is most conveniently carried out by mixing a solution of the steroid starting material and the quinone in one of the above-mentioned solvents with a solution of the aluminum alkoxide in benzene, toluene or xylene, but possible variations in this procedure will be apparent to those skilled in the art. The reaction may be carried out at any temperature between 0° and 150° C., the time required being reduced by the use of the higher temperatures. The preferred temperatures are room temperature, especially for sensitive compounds, when the reaction may take 24 hours or several days, or the reflux temperature of the mixture, when reaction is usually complete within ½ to 2 hours. The product may be isolated, for example, by pouring the reaction mixture into an aqueous solution of sodium or potassium hydroxide, extracting the steroidal material with a solvent such as ether, benzene or chloroform, and washing and evaporating the organic solution.

The process of the invention is applicable to a wide range of steroidal compounds and in particular may be applied to $3\beta$-hydroxy-methyl-$\Delta^5$-derivatives of androstane, pregnane, cholestane or spirostane.

Tert.-hydroxyl groups [other than $17\alpha$-hydroxy groups in pregnan-20-one derivatives (which require esterification)] at positions such as 11, 14 and 17 will not, in general, interfere with the process of the invention. Hydroxyl groups at positions such as 11, 17, 20 or 21 will, in general, require protection by esterification or conversion to such derivatives as tetrahydropyranyl derivatives.

The following groups do not, in general, interfere with the process of the invention:

Oxo groups at positions such as C-11,17 or 20, alkyl groups containing up to five carbon atoms, and in particular methyl groups, at positions such as C-16 or 17, and ethinyl, or alkyl-substituted ethinyl groups, containing up to five carbon atoms, at C-17. Ethylenic linkages not conjugated with the ethylenic linkages at C-5,6, and in particular ethylenic linkages at positions such as C-16,17, also do not, in general, interfere with the process of the invention.

Following is a description, by way of example, of methods for carrying the invention into effect.

EXAMPLE 1

$17\alpha$-acetoxy - $3\beta$-hydroxy-6-methylpregn-5 - en-20-one (1 g.) aluminum tert.-butoxide (1 g.) and p-benzoquinone (6 g.) were dissolved in dry benzene (100 ml.) and the mixture was heated under reflux for 30 minutes. The reaction mixture was cooled and washed with potassium hydroxide solution until the benzene layer was colourless. The benzene was washed with water, dried and evaporated to dryness under reduced pressure. The residue crystallised from acqueous methanol to give $17\alpha$-acetoxy-6 - methylpregna-4,6 - diene-3,20-dione, needles, M.P. 214 to 216° C., $[\alpha]_D^{24}+5°$ (c., 0.158 in chloroform), $\lambda_{max.}^{EtOH}$ 287.5 m$\mu$ (log $\epsilon=4.40$), $\nu_{max.}^{CS_2}$ 1738, 1716, 1256 and 1244 cm.$^{-1}$ $\nu_{max.}$ 1660, 1620, 1575 cm.$^{-1}$ in liquid paraffin.

EXAMPLE 2

$3\beta$-hydroxy - 6-methylandrost-5-en-17-one (2 g.) aluminum tert.-butoxide (2 g.) and p-benzoquinone (3.3 g.) were dissolved in dry benzene (200 ml.) and the mixture was stirred at room temperature for 48 hours. The benzene was washed with potassium hydroxide solution (5%) until colourless and the combined washings were extracted with benzene (3×100 ml.). The combined benzene extracts were washed with water, dried and evaporated to dryness. The residue, crystallised from methanol to give 6-methyl-androsta-4,6-diene-3,17-dione, prisms, M.P. 164 to 165° C., $[\alpha]_D^{21}+139°$ (c., 0.512 in chloroform), $\lambda_{max.}^{EtOH}$ 287 m$\mu$ (log $\epsilon=4.37$)

EXAMPLE 3

$3\beta$-hydroxy-6-methylpregn-5-en-20-one (2 g.), aluminium isopropoxide (2 g.) and p-benzoquinone (3.3 g.) were dissolved in dry benzene (200 ml.) and the mixture was stirred at room temperature for 24 hours. The product was isolated as described in the previous example. 6-methylpregna-4,6-diene-3,20 - dione craystallised from hexane in plates, M.P. 152 to 154° C., $[\alpha]_D^{23}+176°$ (c., 0.564 in chloroform), $\lambda_{max.}^{EtOH}$ 288.5 m$\mu$ (log $\epsilon=4.37$)

EXAMPLE 4

6-methyl-25D-spirost-5-en-$3\beta$-ol (4 g.), aluminium tert.-butoxide (4 g.) and p-benzoquinone (6 g.) were dissolved in benzene (400 ml.) and the mixture was stirred at room temperature for 72 hours. The product was isolated as described in Example 2, and crystallised from acetone/hexane to give 6-methyl-25D-spirosta-4,6-dien-3-one, prisms, M.P. 215 to 217° C., $[\alpha]_D^{23}-67°$ (c., 0.390 in chloroform), $\lambda_{max.}^{EtOH}$ 289 m$\mu$ (log $\epsilon=4.37$)

EXAMPLE 5

$17\alpha$-caproyloxy-$3\beta$-hydroxy-6 - methylpregn - 5 - en-20-one (1 g.), aluminium tert.-butoxide (1 g.) and p-benzoquinone (3.3 g.) were dissolved in dry benzene (200 ml.) and left at room temperature for 48 hours. The product was isolated as described in Example 2. Crystallisation from aqueous methanol gave $17\alpha$-caproyloxy-6-methylpregna-4,6-diene-3,20-dione as needles, M.P. 128 to 130° C., $[\alpha]_D^{23}-12°$ (c., 0.72 in chloroform), $\lambda_{max.}^{EtOH}$ 286.6 m$\mu$ (log $\epsilon=4.37$)

EXAMPLE 6

6-methylcholest-5-en-$3\beta$-ol (2 g.), aluminium tert.-butoxide (2 g.) and p-benzoquinone (6.5 g.), dissolved in dry benzene (400 ml.), were stirred at room temperature for 24 hours. The product was isolated as described in Example 2. 6-methylcholesta-4,6-dien-3-one crystallised in needles from methanol, M.P. 91 to 92° C., $[\alpha]_D^{20}+37°$ (c., 0.107 in chloroform), $\lambda_{max.}^{EtOH}$ 290 m$\mu$ (log $\epsilon=4.37$)

EXAMPLE 7

$17\alpha$-ethinyl-6-methylandrost - 5 - ene-$3\beta$,$17\beta$-diol (1 g.), aluminium tert.-butoxide (1 g.) and p-benzoquinone (3.5 g.) were dissolved in dry benzene (200 ml.) and stirred at room temperature for 24 hours. The product was isolated as described in Example 2. The crude product crystallised from aqueous methanol in needles to give $17\alpha$-ethinyl-$17\beta$-hydroxy - 6 - methylandrosta-4,6-dien-3-one, M.P. 200 to 201° C., $[\alpha]_D^{20}-58°$ (c., 1.03 in chloroform), $\lambda_{max.}^{EtOH}$ 290 m$\mu$ (log $\epsilon$ =4.36)

EXAMPLE 8

6,17$\alpha$-dimethylandrost-5-ene-3$\beta$,17$\beta$-diol (1 g.), treated in the same manner as described in the foregoing Example 7, gave 6,17$\alpha$-dimethyl-17$\beta$-hydroxyandrost-4,6-dien-3-one, M.P. 160 to 161° C., $[\alpha]_D^{23}+38°$ (c., 0.52 in chloroform), $\lambda_{max.}^{EtOH}$ 290 m$\mu$ (log $\epsilon$ =4.37)

EXAMPLE 9

3$\beta$-hydroxy-6-methylandrost-5-en-17-one (2 g.) and p-benzoquinone (2 g.) in dry dioxan (30 ml.) were treated with aluminium isopropoxide (2 g.) and aluminium chloroisopropoxide (0.5 g.) in dry benzene (20 ml.) at room temperature for 24 hours. Isolation as described in Example 2 gave 6-methylandrosta-4,6-diene-3,17-dione, M.P. 164 to 165° C.

EXAMPLE 10

3$\beta$-hydroxy-6-methylpregna-5,16-dien-20-one (3 g.), chloranil (6 g.) and aluminium tert.-butoxide (3 g.) in dry toluene (120 ml.) were heated under reflux for 1 hour. Isolation of the product as described in Example 1, and purification from acetone/hexane (1:3), gave 6-methylpregna-4,6,16-triene-3,20-dione in prisms, M.P. 169 to 171° C., $[\alpha]_D^{25}+140°$ (c., 0.34 in chloroform), $\lambda_{max.}^{EtOH}$ 239 m$\mu$ (log $\epsilon$ =4.08) and 288.5 m$\mu$ (log $\epsilon$ =4.37)

EXAMPLE 11

17$\alpha$-caproxy-3$\beta$-hydroxy-6-methylpregn-5-en-20-one (1.45 g.), p-benzoquinone (2.5 g.) and aluminium isopropoxide (1.5 g.) were dissolved in dry benzene (150 ml.) and stirred at room temperature for 66 hours. The product was isolated as described in Example 2 yielding 17$\alpha$-caproxy-6-methylpregna-4,6-diene-3,20-dione, $\lambda_{max.}^{EtOH}$ 287 m$\mu$ (log $\epsilon$ =4.37)

EXAMPLE 12

3$\beta$-hydroxy-16,17-isopropylidenedioxy-6-methylpregn-5-ene-20-one (3.9 g.), aluminium tert.-butoxide (4 g.) and p-benzoquinone (24 g.) were dissolved in dry toluene (200 ml.) and the mixture was heated under reflux for 45 minutes. The reaction mixture was cooled and washed with potassium hydroxide solution until the toluene layer was colourless. The toluene was removed by steam distillation, and the residue purified from aqueous ethanol to give 16,17-isopropylidenedioxy-6-methylpregna-4,6-diene-3,20-dione, needles, M.P. 206 to 208° C., $[\alpha]_D^{27}+72°$ (c., 0.97 in chloroform), $\lambda_{max.}^{EtOH}$ 287.5 m$\mu$ (log $\epsilon$ =4.37)

EXAMPLE 13

17$\alpha$-n-butyroxy-3$\beta$-hydroxy-6-methylpregn-5-en-20-one (4 g.), aluminium tert.-butoxide (4 g.) and p-benzoquinone (6 g.) were dissolved in benzene (400 ml.) and left at room temperature for 48 hours. The product was isolated as described in Example 2. Crystallisation from hexane gave 17$\alpha$-n-butyroxy-6-methylpregna-4,6-diene-3,20-dione, needles, M.P. 102 to 104° C., $[\alpha]_D^{21}-27°$ (c., 0.95 in chloroform), $\lambda_{max.}^{EtOH}$ 288 m$\mu$ (log $\epsilon$ =4.37)

EXAMPLE 14

3$\beta$-hydroxy-6-methyl-17$\alpha$-n-valeroxypregn-5-en-20-one (3 g.), aluminium tert.-butoxide (3 g.) and p-benzoquinone (5 g.) were dissolved in benzene (300 ml.) and left at room temperature for 5 days. The product was isolated as described in Example 2 giving 6-methyl-17$\alpha$-n-valeroxypregna-4,6-diene-3,20-dione, $\lambda_{max.}^{EtOH}$ 288 m$\mu$ (log $\epsilon$ =4.37), $\nu_{max.}^{Nujol}$ 1740, 1722, 1665, 1625 and 1585 cm.$^{-1}$

EXAMPLE 15

6,16-dimethylpregna-4,6,16-triene-3,20-dione

3$\beta$-hydroxy-6,16-dimethylpregna-5,16-dien-20-one, M.P. 149° C., $[\alpha]_D^{21}-99°$ (c., 0.292 in chloroform), $\lambda_{max.}^{EtOH}$ 251–253 m$\mu$ ($\epsilon$ =8806)

(prepared by addition of excess diazomethane to 3$\beta$-hydroxy-6-methylpregna-5,16-dien-20-one with subsequent thermal decomposition of the resultant pyrazoline) (2 g.), aluminium tert.-butoxide (2 g.) and p-benzoquinone (3.3 g.) were stirred in dry benzene (200 ml.) for 72 hours at room temperature. The benzene was then washed with 5% aqueous sodium hydroxide solution and water, dried over anhydrous sodium sulphate, and evaporated to dryness. The residue was crystallised from acetone to give 6,16-dimethylpregna-4,6,16-triene-3,20-dione, needles, M.P. 163 to 165° C., $\lambda_{max.}^{EtOH}$ 256 m$\mu$ (log $\epsilon$ =4.16), $\lambda_{max.}^{EtOH}$ 288 m$\mu$ (log $\epsilon$ =4.37)

$[\alpha]_D^{23}+36°$ (c., 0.78 in chloroform).

EXAMPLE 16

17$\beta$-hydroxy-6-methyl-17$\alpha$-(prop-1-ynyl)androsta-4,6-dien-3-one

3$\beta$,17$\beta$-dihydroxy-6-methyl-17$\alpha$-(prop-1-ynyl)androst-5-ene (2 g.) M.P. 164 to 166° C., $[\alpha]_D^{22}-105°$ (c., 0.5 in chloroform), (prepared by the reaction between propynyl magnesium bromide and 3$\beta$-hydroxy-6-methylandrost-5-en-17-one) aluminium tert.-butoxide (2 g.) and p-benzoquinone (3.3 g.) in dry benzene (200 ml.) were stirred at room temperature for 72 hours. The product was isolated as described above and crystallisation from aqueous methanol yielded 17$\beta$-hydroxy-6-methyl-17$\alpha$-(prop-1-ynyl)androsta-4,6-dien-3-one in needles, M.P. 178 to 180° C., $[\alpha]_D^{23}-104°$ (c., 0.49 in chloroform)

$\lambda_{max.}^{EtOH}$ 288.5 m$\mu$, (log $\epsilon$ =4.33)

EXAMPLE 17

6,16-dimethyl-16,17-epoxypregna-4,6-diene-3,20-dione

3$\beta$-hydroxy-6,16-dimethyl-16,17-epoxypregn-5-en-20-one [M.P. 161 to 162° C., $[\alpha]_D^{22}-17°$ (c., 0.94 in chloroform), prepared by treating 3$\beta$-hydroxy-6,16-dimethylpregna-5,16-dien-20-one with hot alkaline hydrogen peroxide in methanolic solution] (2 g.), aluminium isopropoxide (2 g.) and p-benzoquinone (3.3 g.), in dry benzene (200 ml.) were stirred for 48 hours at room temperature. Isolation of the product as described above gave 6,16-dimethyl-16,17-epoxypregna-4,6-diene-3,20-dione, purified from aqueous methanol, needles, M.P. 146 to 147° C., $[\alpha]_D^{23}+138°$ (c., 0.38 in chloroform), $\lambda_{max.}^{EtOH}$ 288 m$\mu$ (log $\epsilon$ =4.39)

EXAMPLE 18

17-propionoxy-6-methylpregna-4,6-diene-3,20-dione

3$\beta$-hydroxy-17$\alpha$-propionoxy-6-methylpregn-5-en-20-one, (2 g.) aluminium tert.-butoxide (2 g.) and p-benzoquinone (3.3 g.) were mixed with dry benzene (200 ml.) and stirred for 72 hours at room temperature. The product was isolated as described above and purified by crystallisation from methanol to give 17$\alpha$-propionoxy-6-methylpregna-4,6-diene-3,20-dione, needles, M.P. 134 to 135° C., $[\alpha]_D^{23}+9°$ (c., 0.35 in chloroform), $\lambda_{max.}^{EtOH}$ 288 m$\mu$ (log $\epsilon$ =4.37)

EXAMPLE 19

Formula for 1,000 tablets.

Materials:

| | |
|---|---|
| 17α - acetoxy-6-methyl-pregn-4,6-diene-3,20-dione | 0.5 g. |
| Lactose, B.P. | 125 g. |
| Magnesium stearate | A sufficient quantity. |
| Starch paste, 10% | Do. |
| Starch B.P. | Sufficient to produce 150 g. |

*Process.*—The steroid, lactose, and two-thirds of the starch are mixed together, moistened with a suitable quantity of starch paste and granulated through a No. 20 mash screen.

The granule is dried at 50° C., again passed through a No. 20 mesh screen, and the magnesium stearate added, together with sufficient starch to produce the required weight. The granule is compressed to produce tablets each weighing 150 mg.

We claim:

1. A method for the preparation of 6-methyl-3-oxo-$\Delta^{4,6}$-steroids having the general formula

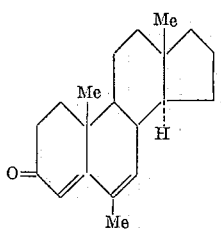

(II)

which method comprises reacting a 3β-hydroxy-6-methyl-$\Delta^5$-steroid having the general formula

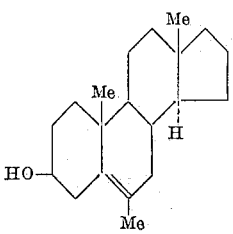

(III)

with a benzoquinone selected from the group consisting of p-benzoquinone and chloranil in the presence of an Oppenauer oxidant.

2. A method as claimed in claim 1 wherein the Oppenauer oxidant is selected from the group consisting of aluminium isopropoxide, aluminium tert.-butoxide and aluminium chloroisopropoxide in an organic solvent.

3. 17-acyloxy-6-methylpregna-4,6-diene-3,20-diones having the general formula

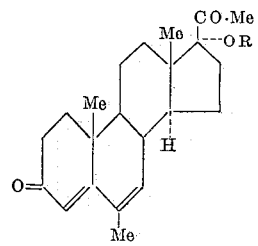

(I)

(where R is an alkanoyl group containing up to ten carbon atoms).

4. A compound of the structural formula

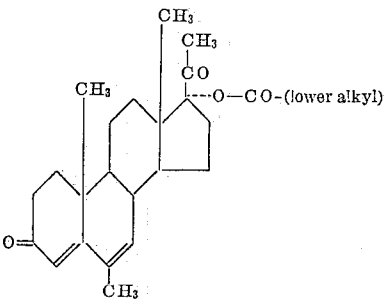

5. 17α-acetoxy-6-methylpregna-4,6-diene-3,20-dione.
6. 17α-caproxyloxy-6-methylpregna-4,6-diene-3,20-dione.
7. 17α-n-butyroxy-6-methylpregna-4,6-diene-3,20-dione.
8. 17α-n-valeroxy-6-methylpregna-4,6-diene-3,20-dione.
9. 17α-propionoxy-6-methylpregna-4,6-diene-3,20-dione.
10. 6,16-dimethyl-16α,17α-epoxypregna-4,6-diene-3,20-dione.
11. A pharmaceutical preparation comprising a 17-alkanoyloxy-6-methylpregna-4,6-diene-3,20-dione, wherein the alkanoyloxy group contains up to 10 carbon atoms in admixture with a pharmaceutically acceptable inert carrier.
12. A pharmaceutical preparation in dosage unit form comprising 17α-acetoxy-6-methylpregna-4,6-diene-3,20-dione in admixture with lactose, magnesium stearate and starch.

References Cited

UNITED STATES PATENTS

| | | | |
|---|---|---|---|
| 2,311,102 | 2/1943 | Wettstein | 260—397.4 |
| 2,882,282 | 4/1959 | Agnello et al. | 260—397.3 |
| 2,891,079 | 6/1959 | Dodson et al. | 260—397.4 |
| 2,900,382 | 8/1959 | Sondheimer et al. | 260—239.55 |

LEWIS GOTTS, *Primary Examiner.*

L. H. GASTON, *Assistant Examiner.*